United States Patent [19]

Tsai

[11] Patent Number: 4,826,885

[45] Date of Patent: May 2, 1989

[54] COMPATIBLE POLYOL BLENDS FOR HIGH MODULUS POLYURETHANE COMPOSITIONS

[75] Inventor: Chung-Chieh Tsai, Dublin, Ohio

[73] Assignee: Ashland Oil, Inc., Ashland, Ky.

[21] Appl. No.: 192,858

[22] Filed: May 11, 1988

[51] Int. Cl.$^4$ .............................................. C08G 18/14
[52] U.S. Cl. ............................... 521/176; 252/182.25;
252/182.27; 528/77
[58] Field of Search .......................... 521/176; 528/77;
252/182.25, 182.27

[56] References Cited

U.S. PATENT DOCUMENTS 4,385,133 5/1983 Alberino et al. ...................... 528/66

Primary Examiner—Maurice J. Welsh
Attorney, Agent, or Firm—Mueller and Smith

[57] ABSTRACT

Disclosed is the compatibilizing of an incompatible blend of a long-chain polyether polyol and a short chain diol by providing that the polyether polyol comprises at least two polyoxypropylene triols, one of which has a molecular weight of between about 2,000 and 8,000, the second of which has a molecular weight of between about 300 and 900. The blend is fluid and substantially devoid of polyoxyethylene polyol content.

26 Claims, No Drawings

COMPATIBLE POLYOL BLENDS FOR HIGH MODULUS POLYURETHANE COMPOSITIONS

BACKGROUND OF THE INVENTION

The present invention relates to polyol blends such as are used in preparation of polyurethane molded parts and more particularly to the stabilization of such polyol blends and to improved polyurethane thermoset molded parts made therefrom.

Reaction Injection Moldings (RIM) of urethanes basically consist of a polyol and a polyisocyanate, usually with an extender (e.g. a glycol or a diamine), optionally with a blowing agent (e.g. air), optional reinforcing material (e.g. glass, mica, etc.), wetting agents, and the like, which materials are high pressure injected through a mixing head into a pre-heated mold with usual post-molding baking thereafter applied. RIM urethanes can range from low modulus to very high modulus material parts, foamed on the interior but with a smooth surface. RIM urethanes are capable of being made into very large one-piece parts which are very light in weight. Typical present-day uses of RIM parts include, for example, automobile parts (e.g. bumpers, air deflectors, fenders, front ends, etc.), business machine housings, ski boots, office furniture, and a wide variety of products.

When a glycol extender is utilized in conjunction with a long chain polyol, such as a long chain polyoxyalkylene polyol, it has been reported that the blend suffers from storage stability by separating into two phases. Such phase separation creates difficulties at the plant since mixing of the phase-separated blend must precede use of the blend whether such blend is utilized in RIM part formation or is utilized for other purposes. A variety of proposals aimed at rendering the mixture of long chain polyol and short chain diol compatible have appeared in the art. For example, U.S. Pat. No. 3,929,730 proposes to compatibilize the blend of a polyol and 1,4-butanediol by the addition of thiodiglycol or phenylenediethanolamine. U.S. Pat. No. 3,993,576 proposes to compatibilize mixtures of high molecular weight polyols and low molecular weight polyols by the addition of a butylene glycol or propylene glycol such as dibutylene glycol. U.S. Pat. No. 4,220,732 proposes to compatibilize the blend of polyol and glycol by utilizing as the glycol extender a combination of 1,4-butanediol and phenyldiethanolamine. U.S. Pat. No. 4,385,133 compatibilizes the polyol/glycol blend by employing as the polyol component a mixture of specific polyoxypropylene polyoxyethylene polyols of specific molecular weight and functionality. Other proposals involve the use of salts (potassium chloride or potassium acetate) or add a small amount of isocyanate for partial reaction and compatibilization of the blend. Finally, U.S. Pat. No. 4,673,696 proposes to compatibilize the long-chain polyol/short chain diol blend utilizing a stabilizing amount of an ethylenically unsaturated esterol.

Despite such advances in the art, there still exists a need for effectively stabilizing the polyol/glycol blend when making high modulus polyurethane compositions, such as disclosed in U.S. Pat. No. 4,376,834.

BROAD STATEMENT OF THE INVENTION

The present invention is addressed to compatibilizing an incompatible blend of a long chain polyether polyol, such as a long chain polyoxyalkylene polyol, and a short chain diol, such as a glycol. Such method comprises said polyether polyol comprising at least two polyoxypropylene triols, one of which has a molecular weight of between about 2,000 and 8,000, the second of which has a molecular weight of between about 300 and 900. The blend is fluid and substantially devoid of polyoxyethylene polyol content.

Another aspect of the invention is addressed to the preparation of a polyurethane composition by the reaction of an organic polyisocyanate and a blend of a short chain diol and a long chain polyether polyol, said blend phase separating upon storage. The improvement comprises said long chain polyether polyol comprising at least two polyoxypropylene triols, one of which has a molecular weight between about 2,000 and 8,000, the second of which has a molecular weight of between about 300 and 900. Said two polyoxypropylene triols are present in an amount such that the resulting blend does not phase separate under storage. The products of the foregoing methods additonally comprise aspects of the present invention.

Advantages of the present invention include the ability to effectively and efficiently compatibilize a blend of a glycol and a polyether polyol. Another advantage is the ability to make high modulus polyurethane composition with requisite impact and heat distortion temperature characteristics. A further advantage is the increased compatibility of the polyol blend and of the polyol blend/polyisocyanate mixture which is achieved by virtue of the noted polyoxypropylene triols. Yet another advantage is the improved moisture resistance which polyurethane compositions of the present invention exhibit. Yet another advantage is that the improved polyol/polyisocyanate compatibility permits a one-shot molding process to be conducted at a relatively low molding temperature, thus resulting in energy savings and prevent of accidental burning of workers. Yet a further advantage is that cured polyurethane compositions in accordance with the present invention do not require post-curing techniques to be practiced. These and other advantages will be readily apparent to those skilled in the art based upon the description which follows.

DETAILED DESCRIPTION OF THE INVENTION

The three prime ingredients of the compatibilized polyol blend comprise a high molecular weight polyoxypropylene polyol, a short-chain diol, and a compatibilizing low molecular weight polyoxypropylene polyol. Surprisingly, most polyoxypropylene polyols of higher molecular weight, e.g. greater than about 700, are incompatible with alkylene glycols exhibiting phase separation when blended. Unexpectedly, it was discovered that combinations of defined high and low molecular weight polyoxypropylene polyols, however, exhibit compatibility with alkylene glycol is evidenced by storage-stable, one-phase blends thereof. It will be appreciated that longer chain length alkylene glycols exhibit more hydrophobic character and, therefore, tend to be more compatible with high molecular weight polyoxypropylene poloyls. Lower chain length alkylene glycols, e.g. typified by ethylene glycol and diethylene glycol, tend to be rather hydrophilic in character and are the most difficult of alkylene glycols to compatibilize with high molecular weight polyoxypropylene polyols. As noted in the foregoing description of the art, polyoxyethylene-polyoxypropylene polyols have been resorted in the past in order to achieve compatibility alkylene glycols. The hydrophilic character of the oxyethylene units are touted as being important in achieving compatibility. Oxyethylene units, however, are noted for their increased moisture absorption and thus greater hydrolytic instability. The compatibilized formulations of the present invention are not only resistant against phase separation, but have improved water resistance.

Also, it was discovered that the polyol blends of the present invention also exhibit improved compatibility with polyisocyanates. This improved compatibility permits one-shot molding processes, e.g. one-shot RIM processes, to be conducted at relatively low molding temperatures. Moreover, the resulting polyurethane compositions exhibit excellent structural strength without the necessity for post-curing operations being practiced as taught, for example, in U.S. Pat. No. 4,376,834.

Referring initially to the polyoxypropylene polyols of high and low molecular weight, high molecular weight polyoxypropylene triols, for present purposes, have a molecular weight in the range of about 2,000 to 8,000. Low molecular weight polyoxypropylene triols, for present purposes, exhibit a molecular weight in the range of about 300 to 900. The weight ratio of high molecular weight triol to low molecular weight triol is adjusted to accommodate the amount of alkylene glycol in the polyurethane composition so that a phase stable polyol solution is obtained. This ratio broadly ranges from about 3:1 to 1:4 of high molecular weight triol to low molecular weight triol, and preferably from about 1.5:1 to about 1:2.

Polyoxypropylene triols suitably are synthesized from the reaction of propylene oxide and a tri-functional compound which contains groups reactive with propylene oxide. Suitable such groups include, for example, hydroxyl groups, thiol groups, acid groups, and amine groups. Accordingly, triols, trithiols, triacids and triamines are suitable tri-functional compounds which can be reacted with propylene oxide for synthesizing the high and low molecular weight polyoxypropylene triols of the stabilized polyol blend of the present invention. Those skilled in the art will appreciate that the number of propylene oxide units per molecule will be adjusted, depending upon the molecular weight of the propoxylated tri-functional compound, so that the ultimate molecular weight is achieved. Suitable such tri-functional compounds are known in the art such as, for example, glycerine, trimethylol propane, pentaerythritol, and like triols; dithioerythritol, dithiothreitol, citric acid, trioxypropylene triamine, trioxyethylene triamine, and the like and mixtures thereof.

Referring to the short-chain diols, or glycol extenders as they often are referred to in the art, short-chain diols most often are alkylene glycols typically ranging from about 2 to 8 carbon atoms in length. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methyl pentane-1,5-diol, 1,4-cyclohexanedimethanol, and the like and mixtures thereof. Additional short-chain diols, for present purposes, include diethylene glycol, dipropylene glycol, triethylene glycol, tripropylene glycol, and the like and mixtures thereof. It will be appreciated that such glycol extenders can be used alone or can be used in admixture with additional diols, e.g. ester diols and ethylenically unsaturated esterols which themselves can stabilize a blend of a long-chain polyol and a short-chain diol as proposed in U.S. Pat. No. 4,673,696. The proportion of alkylene glycol used in making polyurethane compositions, typified by RIM polyurethane compositions, usually is in the range of about 20 to 100 weight parts per 100 weight parts of the triol blend and preferably from about 30 to 60 weight parts per 100 parts of the triol blend.

The compatibilized polyol blend of the present invention is storage or phase stable which means that the compatibilized blend exhibits single phase characteristics when stored at, for example, room temperature, for a time period of one month or more with storage of up to six months or more expected. Additionally, the compatibilized blend exhibits thermal stability by exhibiting no significant increase in viscosity nor phase separation (measured at room temperature) after being subjected to temperatures as low as −15° C. (5° F.). Thus, not only does the polyoxypropylene triol blend render the long chain polyoxyalkylene triol/short chain diol blend compatible (single phase characteristics), but also renders the blend storage stable.

Any of the organic polyisocyanates commonly employed in the art of preparing polyurethanes can be employed in forming urethane parts from the compatibilized blend of the present invention. Such polyisocyanates often are polymeric isocyanates in order to reduce toxic vapors of isocyanate monomers. Further, alcohol-modified and other modified isocyanate compositions (e.g. thiocyanates) may be used. Polyisocyanates preferably will have from about 2–4 isocyanate groups per molecule in forming urethane parts. Suitable polyisocyanates for use in the present invention include, for example, hexamethylene diisocyanate, 4,4′-toluene diisocyanate (TDI), diphenylmethane diisocyanate (MDI), polymethyl polyphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDI), bis(isocyanatomethyl)cyclohexane ($H_6$XDI), dicyclohexylmethane diisocyanate ($H_{12}$MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The proportion of isocyanate groups to hydroxyl groups in the urethane-forming composition (isocyanate index) typically will range from about 0.5:1 to about 2:1, preferably 0.8:1 to 1.2:1, through such ratio can vary as is well known in this art. The two packages or streams which are utilized in forming RIM parts comprise the compatibilized blend as one stream and the polyisocyanate as the second stream. Increased polyol blend/isocyanate compatibility by dint of the triol combination improves the molding operation (i.e. mixing of streams, e.g. in the mixing head). Each stream may contain appropriate catalytic amounts of catalysts which promote the reaction between hydroxyl groups and isocyanate groups. Urethane-promoting catalysts are well known in the art and include a wide variety of organic and inorganic salts of, and organometallic derivatives of, bismuth, lead, tin, and the like, as well as phosphine and tertiary organic amines. The art cited above contains exemplary lists of such catalysts and should be referred to for a further description thereof.

Other commonly used additives for RIM products can be applied to the present invention provided that they are inert to the stability and reactivity of the composition. Such additives include, for example, fillers, blowing agents, reinforcing agents, dyes, pigments, moisture scavengers, diluents, surfactants, mold release agents, and the like.

The following examples show how the present invention has been practiced, but should not be construed as limiting. In this application, all units are in the metric system, and all percentages and proportions are by weight, unless otherwise expressly indicated. Also, all citations set forth herein are expressly incorporated here by reference.

EXAMPLES

Example 1

A polyoxypropylene triol blend consisting of 38.5 g of a high molecular weight polyoxypropylene triol (Pluracol TP 2540 brand triol, molecular weight (MW) 2600, BASF Corporation) and 55 g of a low molecular weight triol (Pluracol TP 440 brand triol, MW 400, BASF Corporation) was mixed with 44 g of diethylene glycol. The mixture was a homogeneous solution which was resistant to phase separation. A mixture of the high molecular weight triol and diethylene glycol, however, did not form a homogeneous solution evidenced by its separation into two phases.

To the homogeneous solution was added 0.60 g of an amine catalyst (Polycat 41 brand, Air Products and Chemical Company) and 0.20 g of potassium ethylhexanoate (T-45 brand, M & T Chemicals, Inc.). This catalyzed resin then was mixed with 213 g (1.65 moles of isocyanate groups) of polymeric diphenylmethane diisocyanate (Mondur E-429 brand, 60–70% MDI, specific gravity 1.24 at 25° C., bulk density 10.3 lbs/gal, Mobay Chemical Company). The mixture was stirred for about 20 seconds and then poured into a pre-heated (90° C.) glass mold. The mixture cured in the mold within 30 seconds. The resulting plaque then was demolded in three minutes. The plaque, measuring 10"×12"×0.125", was cut into specimens for testing of its flexural modulus and flexural strength (ASTM D-790), tensile strength (ASTM D-412), heat distortion temperature (HDT, ASTM D-648), and notched Izod and unnotched Izod impact strength (ASTM D-256). The plaque exhibited the following properties:

| | |
|---|---|
| Flexural modulus | 326 Ksi |
| Flexural strength | 13.2 Ksi |
| Tensile strength | 8.52 Ksi |
| HDT | 70.7° C. |
| Notched Izod | 2.0 ft-lb/in |
| Unnotched Izod | 20.2 ft-lb/in |

These data demonstrate that the high molecular weight/low molecular weight polyoxypropylene triol blend successfully compatibilized the diethylene glycol as a polyol blend and with the addition of the polyisocyanate. The resulting composition was molded at relatively low temperature and resulted in a polyurethane product which exhibits high impact resistance as defined in U.S. Pat. No. 4,376,834.

Examples 2-4

Additional polyuethane compositions were made by using the various compositions and procedures as described in Example 1, except that the mold temperature was descreased to 75° C. The compositions, physical properties of the compositions, and physical properties of the resulting molded plaques are listed below:

TABLE 1

| | Ex. 2 | Ex. 3 | Ex. 4 |
|---|---|---|---|
| Polyol Blend | | | |
| Pluracol TP 2540 (g) | 41.4 | 42.6 | 36.0 |
| Pluracol TP 440 (g) | 59.1 | 67.0 | 72.0 |
| Diethyglycol (g) | 47.3 | 42.6 | 42.0 |
| Polycat 41 | 0.74 | 0.77 | 0.75 |
| Viscosity (cps at 25° C.) | 258 | 268 | 278 |
| Polyisocyanate | | | |
| Mondur E-429 (g) | 202.3 | 197.8 | 200 |
| Molded Polyurethane Plaque Physical Properties | | | |
| Flexural Modulus (Ksi) | 325 | 311 | 339 |
| Flexural Strength (Ksi) | 12.2 | 11.7 | 12.7 |
| Tensile Strength (Ksi) | 8.04 | 7.85 | 8.15 |
| Tensile Modulus (Ksi) | 301 | 290 | 308 |
| Elongation % | 6.4 | 6.0 | 5.7 |
| Heat Distortion Temp (°C., at 264 Psi) | 82.6 | 78.8 | 76.7 |
| Notched Izod (ft-lb/in) | 2.0 | 2.4 | 2.0 |
| Unnotched Izod (ft-lb/in) | 30.1 | 19.6 | 35.4 |

Again, the above-tabulated data demonstrates the compatibilized polyol blend, its use in formulating polyurethane-forming compositions, and the excellent results which the molded polyurethane products exhibit.

Examples 5-8

A series of polyurethane compositions with various amounts of continuous glass fiber (OCF 8610 brand glass fiber, Owens-Corning Fiberglas Company) were prepared using an Accuratio RIM machine (Accuratio System, Inc.). The resin composition was the same as described in Example 1, except the catalyst was 0.5 PHR (parts per 100 parts of polyol resin) of Polycat 41 amine catalyst. Different molding conditions also were used as set forth below in the following table.

TABLE 2

| | Ex. 5 | Ex. 6 | Ex. 7 | Ex. 8 |
|---|---|---|---|---|
| Mold Temperature (°F.) | 200 | 180 | 200 | 200 |
| Time in Mold (min.) | 1 | 2 | 2 | 1 |
| OCF 8610 (layers) | 0 | 3 | 4 | 5 |
| Flexural Modulus (Ksi) | 237 | 782 | 1139 | 1178 |
| Flexural Strength (Ksi) | 9.6 | 25.3 | 34.5 | 36 |
| Tensile Strength (Ksi) | 7.29 | 20.1 | 24.3 | 30.9 |
| Tensile Modulus (Ksi) | 274 | 1043 | 1074 | 1208 |
| Tensile Elongation (%) | 5.98 | 2.6 | 2.86 | 3.11 |
| Heat Distortion Temp. (°C. at 264 psi) | 79 | 224 | 225 | 239 |
| Notched Izod | 1.5 | 14 | 16.8 | 17.1 |
| Unnotched Izod | 13 | 17.3 | 23.7 | 24.5 |

The above-tabulated data further demonstrates the excellent physical properties which molded polyurethane parts prepared in accordance with the precepts of the present invention exhibit.

Examples 9–12

In Examples 9 and 10, polyurethanes were made by the same procedure as described in Example 2 using a blend of high molecular weight Pluracol TP 2540 polyether triol and a different low molecular weight polyether triol (Poly-G-30-280 triol brand, molecular weight 600, Olin Corp.).

In Examples 11 and 12, polyurethanes again were made by the same procedure described in Example 2 using a blend of Pluracol TP 2540 high molecular weight polyether triol and Pluracol TP 440 low molecular weight polyether triol with various amounts of ethylene glycol incorporated into the composition. The compositions and physical properties of the resulting molded polyurethane plaques are set forth below:

TABLE 3

|  | Ex. 9 | Ex. 10 | Ex. 11 | Ex. 12 |
| --- | --- | --- | --- | --- |
| Polyether Blend |  |  |  |  |
| Pluracol TP 2540 | 36.1 | 29.8 | 39.7 | 48.6 |
| Pluracol TP 440 | 0 | 0 | 59.6 | 72.2 |
| Poly G-30-280 | 66.2 | 71.5 | 0 | 0 |
| Ethylene Glycol | 0 | 0 | 14.2 | 26.5 |
| Diethylene Glycol | 48.2 | 47.6 | 28.4 | 0 |
| Polycat 41 | 0.76 | 0.75 | 0 | 0 |
| Fomrez UL-24* | 0 | 0 | 0.29 | 0.30 |
| Viscosity (cps at 25° C.) | 256 | 240 | 250 | 332 |
| Polyisocyanate |  |  |  |  |
| Mondur E-429 (g) | 200 | 201 | 208 | 203 |
| Molded Polyurethane Plaque Physical Properties |  |  |  |  |
| Flexural Modulus (Ksi) | 334 | 345 | 340 | 344 |
| Flexural Strength (Ksi) | 12.9 | 13.0 | 12.8 | 13.1 |
| Tensile Strength (Ksi) | 7.92 | 8.05 | 8.00 | 7.94 |
| Tensile Modulus (Ksi) | 255 | 276 | 299 | 310 |
| Elongation % |  |  |  |  |
| at yield | — | — | 5.8 | 6.0 |
| at break | 15.4 | 13.4 | — | — |
| HDT (°C. at 264 psi) | 74.3 | 71.7 | 74.8 | 69.5 |
| Notched Izod (ft-lb/in) | 1.7 | 1.9 | 2.6 | 1.5 |
| Unnotched Izod (ft-lb/in) | 18.0 | 20.5 | 26.0 | 14.7 |

*Fomrez UL-24 organotin catalyst, Witco Chemical Co.

The above-tabulated results again evidence the compatibilizing effect which the low molecular weight polyether triol displays in compatibilizing high molecular weight polyether triols with extender glycols. In all of the examples, the high molecular weight polyether triol was incompatible with the glycol extender as evidenced by such mixture separating into two phases. Addition of the low molecular weight polyether triol, however, resulted in a stable, one-phase mixture of the polyols, as well as a stable mixture when the polyisocyanate was added thereto. The physical properties of the resulting molded urethane parts make the composition quite useful as a coating, adhesive, or thermoset. Specifically, these properties make the inventive polyurethane compositions useful for a one-shot processing such as in resin transfer molding (RTM) and reaction injection molding (RIM).

Examples 13 and 14

The present invention achieves compatibility of short-chain diols and long-chain polyether polyols without resort to use of oxyethylene compounds, yet provides improved water resistance to the final urethane part. In order to demonstrate this advantage, polyurethane plaques were made from two comparable compositions using the procedure of Example 2. The inventive composition (Example 13) used diethylene glycol and a blend of polyoxypropylene triols. The comparative composition (Ex. 14) used diethylene glycol and a blend of polyoxypropylene-polyoxyethylene triols. The water absorption test used five specimens (100 mm × 12.5 mm × 3.2 mm) cut from each molded plaque. Each specimen was weighed before and after being boiled in water for 24 hours. Percentage weight gains were averaged for each composition.

TABLE 4

|  | Ex 13 | Ex 14 |
| --- | --- | --- |
| Polyeter Blend |  |  |
| Diethylene glycol (g) | 47.3 | 47.3 |
| Pluracol TP 440 (g) | 59.1 | — |
| Poly-G-30-56 (g)[1] | 41.4 | — |
| Poly-G-85-56 (g)[2] | — | 59.1 |
| Poly-G-55-28 (g)[3] | — | 41.4 |
| Polycat 41 | 0.74 | 0.74 |
| Polyisocyanate |  |  |
| Mondur E-429 | 1.05 | 1.05 |
| (Isocyanate Index) |  |  |
| Boiled Water Absorption |  |  |
| Weight-% Increase | 3.4 | 5.9 |

[1] Polyoxypropylene triol, MW = 3000, Olin Corp.
[2] Polyoxypropylene-polyoxyethylene triol, MW = 3000, Olin Corp.
[3] Polyoxypropylene-polyoxyethylene triol, MW = 6000, Olin Corp.

The above-tabulated data demonstrates that the comparative oxyethylene composition resulted in a molded polyurethane plaque that absorbed about 73% more water than the inventive plaque absorbed. Also, the inventive blend was stable. It should be understood that the inventive blend probably can tolerate a small amount of polyoxyethylene content (say, about 5%) and still remain stable. Such blends are "substantially devoid of polyoxyethylene content" for present purposes.

Example 15

This comparative example evaluated the stability of Run No. 7-6, Table II, Example 17, of U.S. Pat. No. 4,376,834. The polyol portion of this composition was a mixture of 9.4 weight parts 1,6-hexanediol and 0.6 weight parts of LHT 28 polyoxypropylene triol (Union Carbide Corporation). These ingredients were melted at 50° C. to give a clear solution. At room temperature, however, the blend crystalized and gave a white wax. These results again demonstrate the uniqueness of the inventive stabilized polyol blend.

Examples 16–17

Flame-resistant polyurethane plaques were made in accordance with the procedure of Example 2 using a different polymeric isocyanate and flame retardant additives.

TABLE 5

|  | Ex. 16 (g) | Ex. 17 (g) |
| --- | --- | --- |
| Polyether Blend |  |  |
| Diethylene Glycol | 30.2 | 29.7 |
| Pluracol TP 440 | 57.0 | 36.3 |
| Pluracol TP 2540 | 47.0 | 41.2 |
| FR-1138[1] | 33.5 | 57.7 |
| Thermoguard S[2] | 13.4 | 13.2 |
| Fomrez 24 | 0.55 | 0.54 |
| Polyisocyanate |  |  |
| Rubinate MF-182[3] | 182.3 | 185.2 |
| Molded Urethane Plaque Physical Properties |  |  |
| Flexural Modulus (Ksi) | 349.1 | 364.9 |
| Flexural Strength (Ksi) | 13.9 | 14.6 |
| Tensile Strength (Ksi) | 7.81 | 8.48 |
| Elongation % at yield | 6.2 | 5.4 |

TABLE 5-continued

|  | Ex. 16 (g) | Ex. 17 (g) |
| --- | --- | --- |
| HDT (°C. at 264 psi) | 70.9 | 79.6 |
| Notched Izod (ft-lb/in) | 1.8 | 1.4 |
| Unnotched Izod (ft-lb/in) | 17.1 | 11.8 |
| Flame Resistency (Rating by UL94 Method) | V-O | V-O |

[1]FR-1138 brand of dibromoneopentyl glycol, Dow Chemical Co.
[2]Thermoguard S brand of antimony oxide, M & T Chemicals, Inc.
[3]Rubinate MF-182 polymeric diphenylmethane diisocyanate, Imperial Chemical Industries.

These results demonstrate that a compatibiized polyether polyol blend can be formulated to include flame-retardant additives.

I claim:

1. A method for making a storage stable blend of a short-chain diol and a long-chain polyether polyol which comprises said polyether polyol comprising at least two polyoxypropylene triols, one of which has a molecular weight of between about 2,000 and 8,000, the second of which has a molecular weight of between about 300 and 900, each said triol present in an amount such that said blend does not phase separate under storage, said blend being substantially devoid of polyoxyethylene polyol content.

2. The method of claim 1 wherein the weight ratio of said higher molecular weight triol to the lower molecular weight triol ranges from between about 3:1 and 1:4.

3. The method of claim 2 wherein said weight ratio ranges from between about 1.5:1 and 1:2.

4. The method of claim 1 wherein said polyoxypropylene triols are synthesized from the reaction of propylene oxide and a tri-functional compound which contains groups reactive with propylene oxide selected from the group consisting of hydroxyl groups, thiol groups, amine groups, acid groups, and mixtures thereof.

5. The method of claim 4 wherein said tri-functional compound is selected from the group consisting of glycerine, trimethylol propane, pentaerythritol, dithioerythritol, dithiothreitol, trioxypropylene triamine, trioxyethylene triamine, citric acid, and mixtures thereof.

6. The method of claim 1 wherein said short-chain diol comprises a $C_2$–$C_8$ alkylene glycol.

7. The method of claim 1 wherein said blend comprises between about 20 and 100 wt-parts of said short-chain diol per 100 wt-parts of said at least two polyoxypropylene triols.

8. The method of claim 7 whrein said blend comprises between about 30 and 60 wt-parts of said short-chain diol per 100 wt-parts of said at least two polyoxypropylene triols.

9. In a method for the preparation of a polyurethane by the reaction of an organic polyisocyanate and a blend of a short-chain diol and a long-chain polyether polyol, said blend phase separating upon storage, the improvement which comprises said long-chain polyether polyol comprising at least two polyoxypropylene triols, one of which has a molecular weight of between about 2,000 and 8,000, the second of which has a molecular weight of between about 300 and 900, each said triol present in an amount such that said blend does not phase separate under storage, said blend being substantially devoid of polyoxyethylene content.

10. The method of claim 9 wherein the weight ratio of said higher molecular weight triol to the lower molecular weight triol ranges from between about 3:1 and 1:4.

11. The method of claim 10 wherein said weight ratio ranges from between about 1.5:1 and 1:2.

12. The method of claim 9 wherein said polyoxypropylene triols are synthesized from the reaction of propylene oxide and a tri-functional compound which contains groups reactive with propylene oxide selected from the group consisting of hydroxyl groups, thiol groups, amine groups, acid groups, and mixtures thereof.

13. The method of claim 12 wherein said tri-functional compound is selected from the group consisting of glycerine, trimethylol propane, pentaerythritol, dithioerythritol, dithiothreitol, trioxypropylene triamine, trioxyethylene triamine, citric acid, and mixtures thereof.

14. The method of claim 9 wherein said short-chain diol comprises a $C_2$–$C_8$ alkylene glycol.

15. The method of claim 9 wherein said blend comprises between about 20 and 100 wt-parts of said short-chain diol per 100 wt-parts of said at least two polyoxypropylene triols.

16. The method of claim 15 wherein said blend comprises between about 30 and 60 wt-parts of said short-chain diol per 100 wt-parts of said at least two polyoxypropylene triols.

17. The method of claim 9 wherein the proportion of isocyanate groups from said polyisocyanate to hydroxyl groups from said blend ranges from about 0.5:1 to about 2:1.

18. The method of claim 9 wherein said proportion ranges from about 0.8:1 to 1.2:1.

19. A storage stable blend which comprises:
   a short-chain diol, a polyoxypropylene triol having a molecular weight of between about 2,000 and 8,000, and a polyoxypropylene triol having a molecular weight of between about 300 and 900, each said triol present in an amount such that the blend does not phase separate under storage, said blend being substantially devoid of polyoxyethylene polyol content, and said blend being in compatible in the absence of said lower molecular weight triol.

20. The blend of claim 19 wherein the weight ratio of said higher molecular weight triol to the lower molecular weight triol ranges from between about 3:1 and 1:4.

21. The blend of claim 20 wherein said weight ratio ranges from between about 1.5:1 and 1:2.

22. The blend of claim 19 wherein said polyoxypropylene triols are synthesized from the reaction of propylene oxide and a tri-functional compound which contains groups reactive with propylene oxide selected from the group consisting of hydroxyl groups, thiol groups, amine groups, acid groups, and mixtures thereof.

23. The blend of claim 22 wherein said tri-functional compound is selected from the group consisting of glycerine, trimethylol propane, pentaerythritol, dithioerythritol, dithiothreitol, trioxypropylene triamine, trioxyethylene triamine, citric acid and mixtures thereof.

24. The blend of claim 1 9 wherein said short-chain diol comprises a $C_2$–$C_8$ alkylene glycol.

25. The blend of claim 19 wherein said blend comprises between about 20 and 100 wt-parts of said short-chain diol per 100 wt-parts of said at least two polyoxypropylene triols.

26. The blend of claim 25 wherein said blend comprises between about 30 and 60 wt-parts of said short-chain diol per 100 wt-parts of said at least two polyoxypropylene triols.

* * * * *